United States Patent
Shiver

(10) Patent No.: US 11,266,143 B2
(45) Date of Patent: Mar. 8, 2022

(54) SAFETY RAIL

(71) Applicant: Robert Warren Shiver, Eclectic, AL (US)

(72) Inventor: Robert Warren Shiver, Eclectic, AL (US)

( * ) Notice: Subject to any disclaimer, the term of this patent is extended or adjusted under 35 U.S.C. 154(b) by 537 days.

(21) Appl. No.: 16/119,421

(22) Filed: Aug. 31, 2018

(65) Prior Publication Data

US 2018/0368392 A1    Dec. 27, 2018

Related U.S. Application Data

(63) Continuation of application No. 14/075,278, filed on Nov. 8, 2013, now Pat. No. 10,064,403.

(51) Int. Cl.
| | | |
|---|---|---|
| *A01M 31/02* | (2006.01) | |
| *E06C 1/06* | (2006.01) | |
| *E06C 1/39* | (2006.01) | |
| *E06C 7/18* | (2006.01) | |

(52) U.S. Cl.
CPC ............... *A01M 31/02* (2013.01); *E06C 1/06* (2013.01); *E06C 1/39* (2013.01); *E06C 7/188* (2013.01)

(58) Field of Classification Search
CPC ......... A01M 31/02; A01M 31/05; E06C 1/04; E06C 1/34; E06C 7/06
See application file for complete search history.

(56) References Cited

U.S. PATENT DOCUMENTS

| | | | |
|---|---|---|---|
| 651,665 A | 6/1900 | Johns | |
| 3,115,211 A | 12/1963 | Ostrander, Jr. | |
| 3,176,794 A | 4/1965 | Evans et al. | |
| 3,666,054 A | 5/1972 | Ellings et al. | |
| 3,817,350 A | 6/1974 | Gray | |
| 4,022,292 A | 5/1977 | Van Gompel | |
| 4,061,202 A | 12/1977 | Campbell | |
| 4,134,474 A * | 1/1979 | Stavenau | A01M 31/02 182/116 |
| 4,183,423 A | 1/1980 | Lewis | |
| 4,552,247 A | 11/1985 | Purdy | |
| 4,579,198 A * | 4/1986 | Lee | E04H 15/001 108/135 |
| 4,592,446 A | 6/1986 | White | |
| 4,787,476 A | 11/1988 | Lee | |
| 4,802,552 A | 2/1989 | Williams | |
| 5,253,732 A | 10/1993 | Daniels | |
| 5,363,941 A | 11/1994 | Richard | |
| 5,454,445 A | 10/1995 | Berryman | |
| 5,492,198 A | 2/1996 | Williams | |
| 5,595,265 A | 1/1997 | Lebrocquy | |
| 5,607,143 A | 3/1997 | Regal | |
| 5,655,623 A | 8/1997 | Skyba | |

(Continued)

OTHER PUBLICATIONS

Attwood Trailer Winch—Installation Instructions (2 pgs.).
Rivers Edge Treestands—Operator's Manual—One-Man Ladder Stands—Revised Feb. 16, 2011—www.HuntRiversEdge.com (48 pgs.).

*Primary Examiner* — Colleen M Chavchavadze
*Assistant Examiner* — Candace L Bradford
(74) *Attorney, Agent, or Firm* — Husch Blackwell LLP

(57) ABSTRACT

A safety rail that can be used in connection with ladder stands is disclosed. The safety rail can be used for the safe installation and/or take down of a ladder stand, and only one user is needed to install and/or take down the ladder stand when using the safety rail as disclosed herein.

14 Claims, 6 Drawing Sheets

(56) References Cited

U.S. PATENT DOCUMENTS

| | | | |
|---|---|---|---|
| 5,791,436 A | 8/1998 | Talley, Sr. | |
| 5,803,694 A | 9/1998 | Steele | |
| 5,927,437 A | 7/1999 | Fast | |
| 5,996,738 A | 12/1999 | Nelsen | |
| 6,006,864 A * | 12/1999 | Musk | E06C 1/34 182/187 |
| 6,045,442 A * | 4/2000 | Bounds | A22B 5/06 182/133 |
| 6,079,517 A | 6/2000 | Payne | |
| 6,095,284 A | 8/2000 | Smith | |
| 6,167,988 B1 * | 1/2001 | Frodge | E06C 1/34 182/107 |
| 6,244,381 B1 | 6/2001 | Ruble | |
| 6,520,291 B2 | 2/2003 | Audrey | |
| 6,533,070 B1 | 3/2003 | Elrod | |
| 6,719,093 B2 | 4/2004 | Garbs | |
| 6,739,964 B2 * | 5/2004 | Gearhart | A22B 5/06 452/187 |
| 6,942,064 B2 | 9/2005 | Wolford | |
| 6,942,065 B1 * | 9/2005 | Price | A01M 31/025 135/901 |
| 7,004,288 B2 | 2/2006 | Araki et al. | |
| 7,168,522 B1 * | 1/2007 | Price | A01M 31/025 135/901 |
| 7,237,649 B2 | 7/2007 | Harmston | |
| 7,287,623 B2 | 10/2007 | Graham, Sr. | |
| 7,314,406 B2 * | 1/2008 | Bilinovich | A01K 5/00 452/185 |
| 7,350,769 B1 * | 4/2008 | Dorzok | A01M 31/02 248/219.1 |
| 7,458,563 B1 * | 12/2008 | Liu | A01M 31/02 254/334 |
| 7,686,566 B1 | 3/2010 | Murphy | |
| 7,717,232 B2 | 5/2010 | Butcher | |
| 7,909,139 B2 | 3/2011 | Blue et al. | |
| 8,684,138 B1 * | 4/2014 | Marsh, II | E06C 7/48 182/116 |
| 2002/0134619 A1 * | 9/2002 | Schwenke | E06C 1/34 182/107 |
| 2003/0000769 A1 | 1/2003 | Pyle | |
| 2003/0098202 A1 * | 5/2003 | Husband | E06C 1/34 182/93 |
| 2003/0178251 A1 | 9/2003 | Hewitt | |
| 2005/0205358 A1 | 9/2005 | Watson | |
| 2007/0089932 A1 | 4/2007 | Boyett | |
| 2007/0114096 A1 * | 5/2007 | Skipper | E06C 1/34 182/116 |
| 2007/0235259 A1 | 10/2007 | Tolliver | |
| 2007/0256892 A1 * | 11/2007 | Breedlove, Sr. | E06C 1/381 182/116 |
| 2008/0156588 A1 * | 7/2008 | Butcher | E06C 1/34 182/200 |
| 2009/0229914 A1 * | 9/2009 | Liles | E06C 7/16 182/63.1 |
| 2009/0229917 A1 | 9/2009 | Berkbuegler | |
| 2009/0272709 A1 * | 11/2009 | Nessner | A01M 31/02 212/270 |
| 2011/0308887 A1 * | 12/2011 | Johnson | A01M 31/02 182/187 |
| 2012/0080266 A1 * | 4/2012 | Brock | E04G 5/06 182/107 |
| 2012/0168249 A1 * | 7/2012 | Furseth | A01M 31/02 182/113 |
| 2012/0211306 A1 * | 8/2012 | Benefield | E06C 7/16 182/115 |
| 2012/0299258 A1 * | 11/2012 | Gallagher | A01M 31/02 280/47.18 |
| 2014/0027204 A1 * | 1/2014 | Niemela | E06C 1/10 182/129 |
| 2014/0202794 A1 * | 7/2014 | Butler | A01M 31/02 182/115 |

\* cited by examiner

SAFETY RAIL

FIELD

The present invention relates generally to ladder stands. More particularly, the present invention relates to a safety rail for use in connection with a ladder stand.

BACKGROUND

Known ladder stands require three people to install the stand. For example, two people are required to erect the stand, and one person is required brace the stand so as to prohibit the stand from sliding during erection.

Once the ladder stand is resting in its upright position, tie off ropes are used to steady the stand before one of the installers climbs the ladder. However, two people must hold the stand in place while the third person ascends the ladder to the top of the stand. Then, the person at the top of the stand must lean over the stand and use a ratchet strap to secure the stand to a tree.

Accordingly, known ladder stands present several disadvantages. For example, when an installer ascends the ladder to the top of the stand and leans over the stand, nothing secures the stand in place, other than the installers on the ground, until the installer at the top of the stand secures the stand to a tree with the ratchet strap. This can be a lot of weight for the installers on the ground to hold. Furthermore, the weight of the installer leaning towards the tree to attach the ratchet strap thereto can cause the stand to move downwards and/or shift. This can result in a very dangerous condition, which can also occur when the ladder stand is taken down.

In view of the above, there is a continuing, ongoing need for a safety rail for use in connection with a ladder stand.

DETAILED DESCRIPTION

Figure 1:
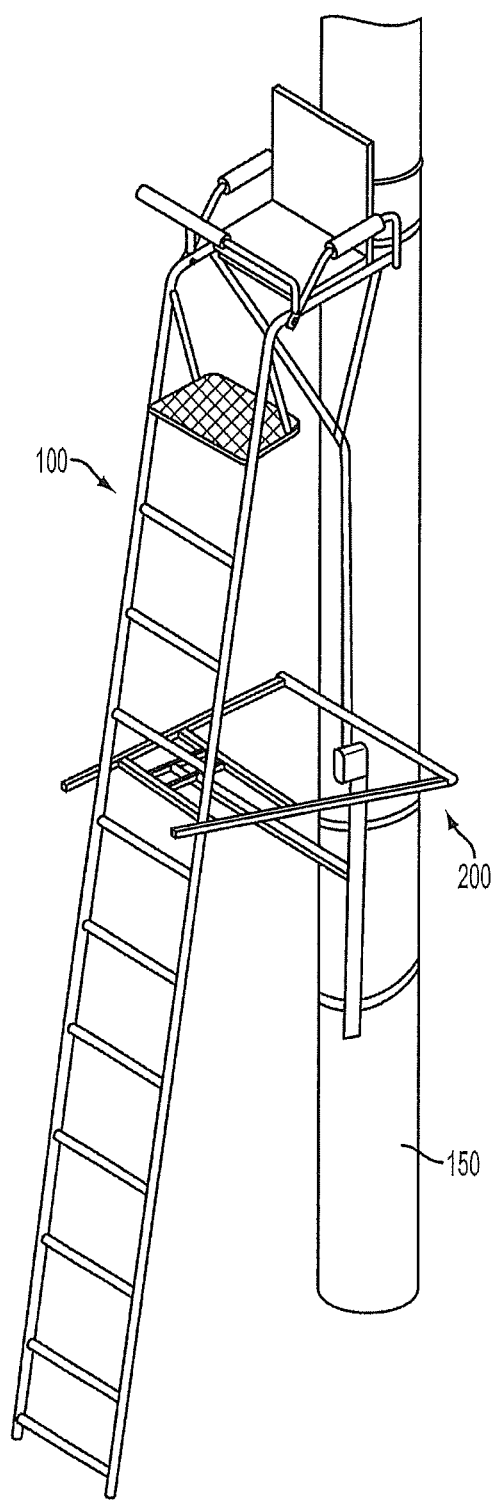
FIG. 1 is a perspective view of a ladder stand and safety rail in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments, Embodiments disclosed herein include a safety rail that can be used in connection with ladder stands. In some embodiments, the safety rail can be used for the safe installation and/or take down of a ladder stand. In some embodiments, only one person or user is needed to install and/or take down a ladder stand when using the safety rail as disclosed herein.

FIG. 1 is a perspective view of a ladder stand 100 and safety rail 200 in accordance with disclosed embodiments. As seen in FIG. 1, the safety rail 200 can be used to safely install and/or take down the ladder stand 100 and can be used to secure the ladder stand 100 to a tree trunk 150. Some and/or all of the safety rail 200 disclosed herein can be plastic, metal, for example, steel, or any other material as would be known and desired by those or ordinary skill in the art. Furthermore, some and/or all of the safety rail 200, including members thereof, can include hollow or solid tubes, bars, or members.

Figure 2:
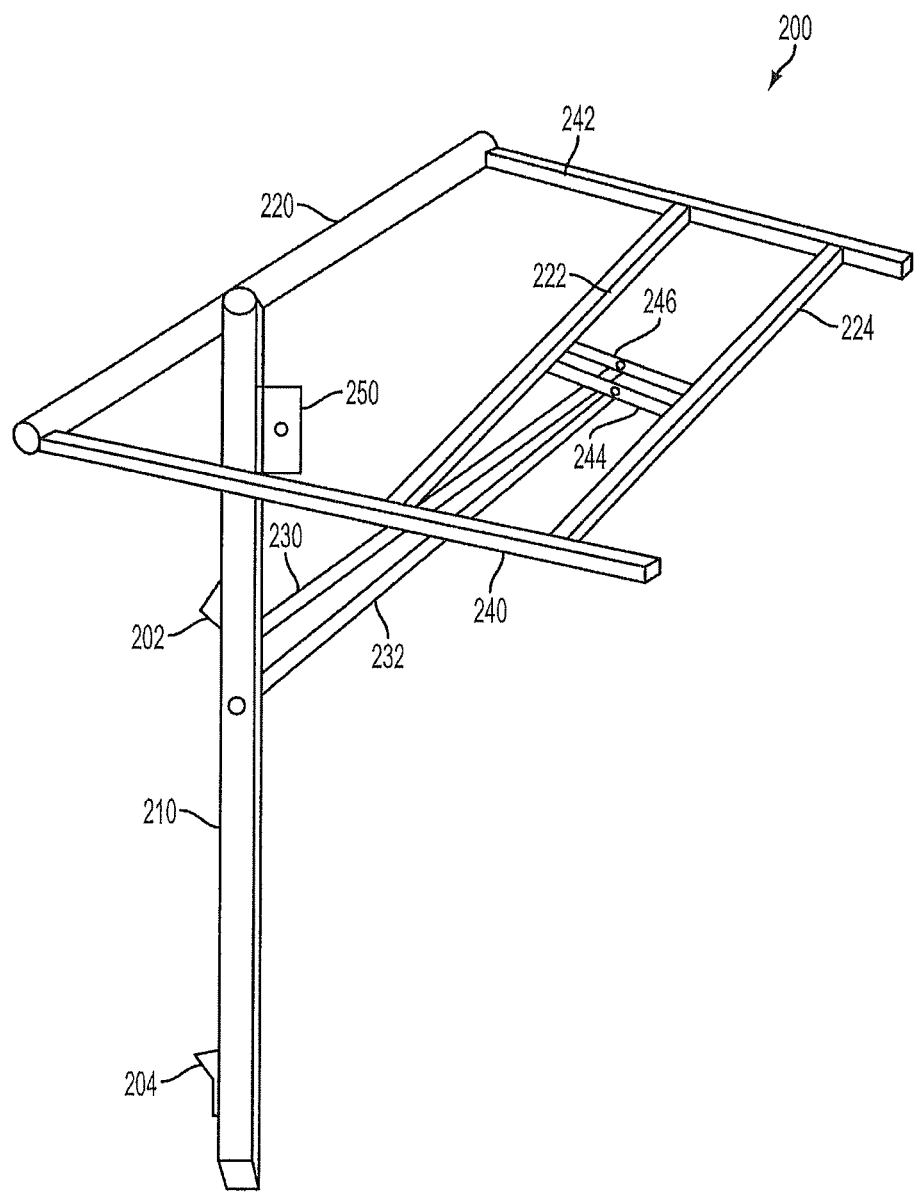
FIG. 2 is a perspective view of a safety rail in accordance with disclosed embodiments.
Figure 3:
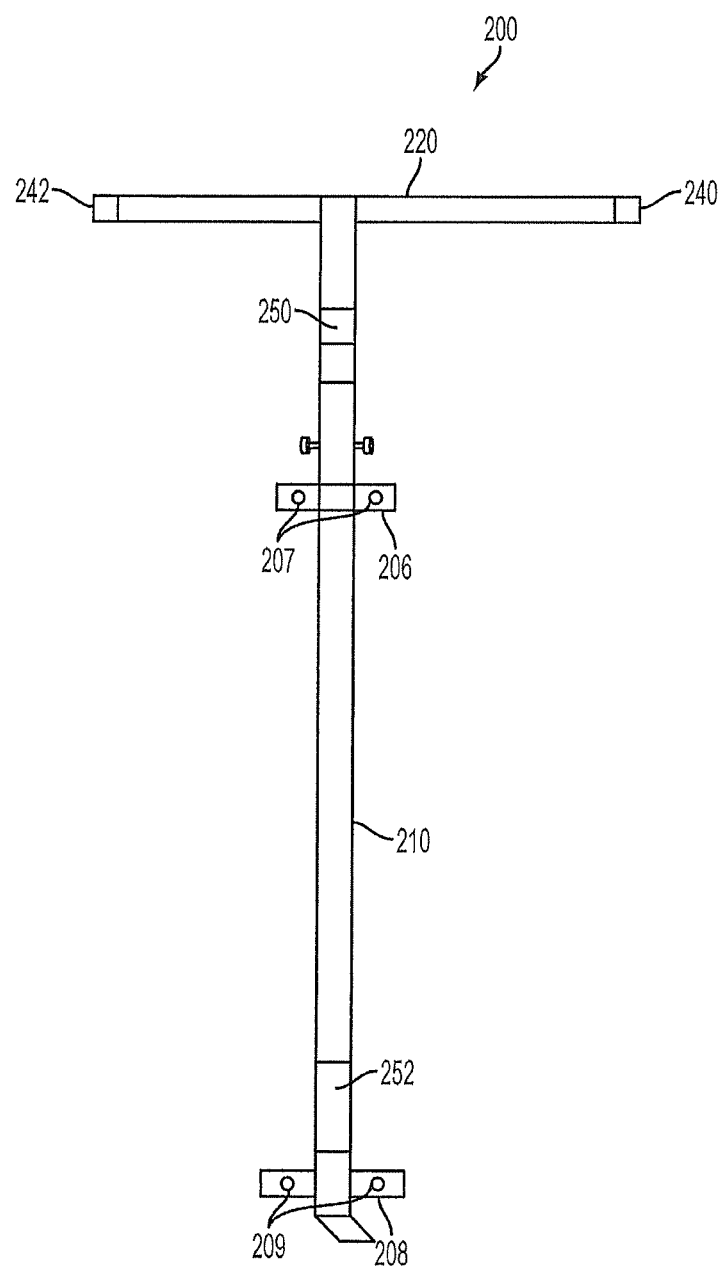
FIG. 3 is a front view of a safety rail in accordance with disclosed embodiments.

FIG. 2 is a perspective view and FIG. 3 is a front view of the safety rail 200 in accordance with disclosed embodiments showing the various details thereof. As seen in FIG. 2 and FIG. 3, the safety rail 200 can include an elongated vertical member 210, first, second, and third stabilizing members 220, 222, 224, first and second anchor members 230, 232, and first, second, third, and fourth cross-bar members 240, 242, 244, 246

The elongated vertical member 210 can attach to tree trunk 150 via first and second mounting brackets 202, 204 and/or via third and fourth mounting brackets 206, 208. For example, in some embodiments, first and second mounting brackets 202, 204 can be disposed on a first side, for example, on a tree side, of the member 210 for attaching to the tree trunk 150. In some embodiments, the first and second mounting brackets 202, 204 can include a tree barb anchor that can be inserted into the tree trunk 150. Additionally or alternatively, in some embodiments, third and fourth mounting brackets 206, 208 can be disposed on or connected to the member 210. Each of the brackets 206, 208 can include connecting mechanisms 207, 209 for connecting to a respective ratchet strap. For example, in some embodiments, the connecting mechanisms 207, 209 can include holes or apertures in the brackets 206, 208 for receiving ratchet hooks of a respective ratchet strap. Then, the ratchet straps can be secured to the tree trunk 150 for securing the member 210 thereto. In some embodiments, the ratchet straps can include hooks on respective ends thereof and can be installed around the tree trunk 150 as would be known by those of skill in the art.

The first stabilizing member 220 can be disposed on and/or connected to a first, top end of the elongated vertical member 210 so as to be perpendicular to the member 210. In some embodiments, the first stabilizing member 220 can be fixedly secured to the elongated vertical member 210.

The first and second cross-bar members 240, 242 can be disposed on and/or connected to respective first and second ends of the first stabilizing member 220 so as to extend from the respective first and second ends of the first stabilizing member 220 in a direction away from an associated tree trunk 150. In some embodiments, each of the first and second cross-bar members 240, 242 can be rotatably connected to the respective first and second ends of the first stabilizing member 220 via, for example, a hinge. When extended into an installed position, each of the first and second cross-bar members 240, 242 can be perpendicular to the member 220.

The second and third stabilizing members 222, 224 can extend between the first and second cross-bar members 240, 242 and be disposed on and/or connected to each of the cross-bar members 240, 242 along the lengths thereof. For example, in some embodiments, each of the second and third stabilizing members 222, 224 can be fixedly connected to each of the first and second cross-bar members 240, 242. When extended into an installed position, each of the second and third stabilizing members 222, 224 can be perpendicular to the elongated vertical member 210.

In some embodiments, the third stabilizing member 224 can be disposed on and/or connected to each of the cross-bar members 240, 242 along the lengths thereof at a predetermined distance from respective distal ends of the cross-bar members 240, 242. Accordingly, the third stabilizing member 224 and distal end portions of each of the cross-bar members 240, 242 can define a region R for receiving the ladder stand 100 when erected.

The third and fourth cross-bar members 244, 246 can extend between the second and third stabilizing members 222, 224 and be disposed on and/or connected to each of the second and third stabilizing members 222, 224 along the lengths thereof. For example, in some embodiments, each of the third and fourth cross-bar members 244, 246 can be fixedly connected to each of the second and third stabilizing members 222, 224, and each of the third and fourth cross-bar members 244, 246 can be perpendicular to the stabilizing members 222, 224.

The first and second anchor members 230, 232 can extend between the elongated vertical member 210 and respective ones of the third and fourth cross-bar members 244, 246. For example, a first, lower end of each of the first and second anchor members 230, 232 be disposed on and/or connected to the elongated vertical member 210 along a length thereof, and a second, upper end of each of the first and second anchor members 230, 232 can be disposed on and/or connected to respective ones of the third and fourth cross-bar members 244, 246 along the lengths thereof. In some embodiments, the first and second anchor members 230, 232 can extend at an angle, for example an approximately 45° angle, relative to the ground and/or to the elongated vertical member 210, in an upward direction from the member 210 to the cross-bar members 244, 246. In some embodiments, each of the first and second anchor members 230, 232 can be rotatably connected to the member 210 and/or to the cross-bar members 244, 246 via, for example, a hinge. Additionally or alternatively, in some embodiments, each of the first and second anchor members 230, 232 can be removably connected to the member 210 and/or to the cross-bar members 244, 246 via, for example, a locking mechanism, such as a pin or a bolt.

Figure 5:
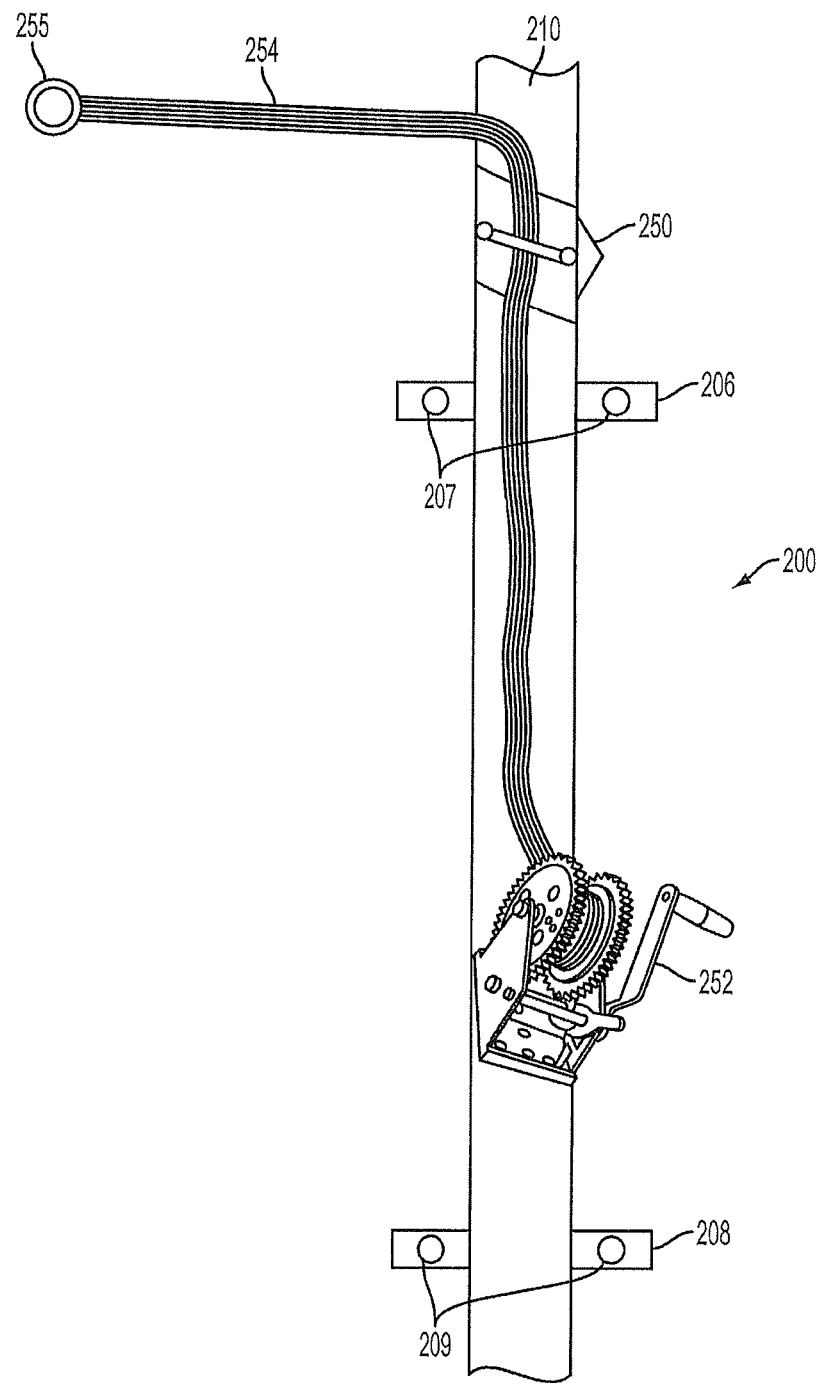
FIG. 5 is a perspective view of a portion of a safety rail and an associated lifting mechanism in accordance with disclosed embodiments.

As best seen in FIG. 5, a lifting mechanism 254, for example, a ratchet strap, a trailer strap, a rope, or the like, can be associated with the safety rail 200 via first and second guiding mechanisms 250, 252 that can be attached or connected to the elongated vertical member 210 along the length thereof. For example, in some embodiments, the first guiding mechanism 250 can include a guide pin attached to an upper portion of the member 210. Additionally or alternatively, in some embodiments, the second guiding mechanism 252 can include a winch, for example, a trailer winch, attached to a lower portion of the member 210. In some embodiments, the second guiding mechanism 252 can include a crank for tightening the lifting mechanism 254.

In some embodiments, one end of the lifting mechanism 254, for example, the end not associated with the second guiding mechanism can be attached to or otherwise associated with first and/or second pull straps 256. For example, pull straps 256 can be attached to the tree stand 100, can balance the stand 100 during erection thereof, and can adjust the stand 100 to a level position.

Figure 4:
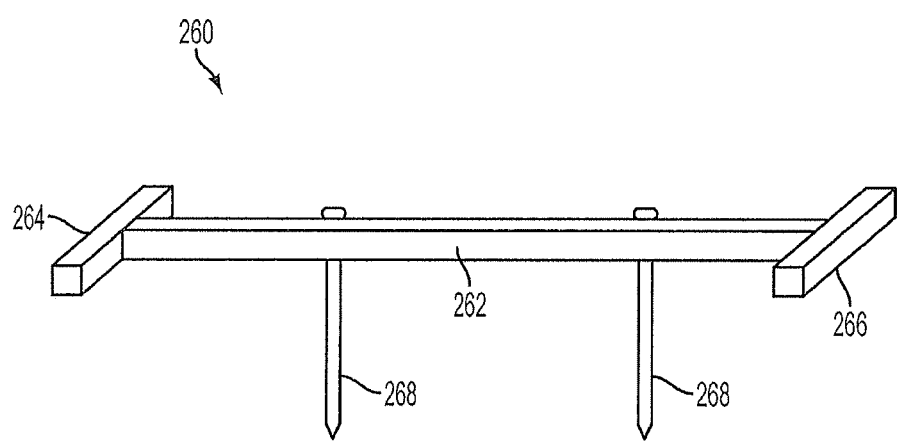
FIG. 4 is a perspective view of a ground anchor of a safety rail in accordance with disclosed embodiments.

During installation, a ground anchor 260, the details of which are shown in FIG. 4, can be disposed at or near a bottom end of the ladder stand 100 to prevent the stand 100 from sliding during erection thereof. Accordingly, the ground anchor 260 can function as a back stop for the ladder stand 100. The ground anchor 260 can include first, second, and third members 262, 264, 266 such that the second and third members 264, 266 can be disposed on and/or connected to respective first and second ends of the first member 262 and so that each of the second and third members 264, 266 is perpendicular to the first member 262. Ground attaching mechanisms 268, such as spikes, can be disposed through or adjacent to the first member 262 along a length thereof. The ground attaching mechanisms 268 can be inserted into the ground to attach and/or affix the mechanisms 268 to the ground and to prevent the ground anchor 260 and accordingly, the stand 100 from sliding forward during erection.

To erect the ladder stand 100 using the safety rail 200 disclosed herein, the first and second anchor members 230, 232 of the safety rail 200 can be affixed to the elongated vertical member 210 and/or to respective ones of the third and fourth cross-bar mechanisms 244, 246 so as to extend the first and second cross-bar members 240, 242 and the second and third stabilizing members 222, 224 into an extended, locked position, that is, into a position so that the stabilizing members 222, 224 are perpendicular to the elongated vertical member 210. Then, the lifting mechanism 254, such as a trailer strap, a ratchet strap, a rope, or the like, can be disposed through the first guiding mechanism 250 and extended to its full length.

The safety rail 200 can be affixed to the tree trunk 150 by disposing respective ends of respective ratchet straps through the connecting mechanisms 207, 209 of the respective third and fourth mounting brackets 206, 208. The ratchet straps can be tightened so as to ratchet the elongated vertical member 210 to the tree trunk 150 and so as to push the first and second mounting brackets 202, 204 into the tree trunk 150.

Once the safety rail 200 is affixed to the tree trunk 150, the ground anchor 260 can be placed a predetermined distance away from the base of the tree trunk 150, and the ground attaching mechanisms 268 can be inserted into the ground. When the ground attaching mechanisms 268 are disposed adjacent the first member 262 of the ground anchor 260, the ground attaching mechanisms 268 can be disposed on the tree side of the first member 262 so as to prevent the ground anchor 260 from sliding when the weight of the ladder stand 100 presses against the non-tree side of the first member 262.

The ladder stand 100 can be assembled as would be known by those of skill in the art and can be laid on the ground so that the tree blade-side of the stand 100 faces upwards and away from the ground. Then, the base of the ladder stand 100 can be positioned adjacent to the non-tree side of the first member 262 of the ground anchor 260 such that the base of the stand 100 is bound on respective sides thereof by the second and third members 264, 266.

When the ladder stand 100 is assembled and in place on the ground, adjacent to the ground anchor 260, a first end 255 of the lifting mechanism 254 can be attached to a top end of the ladder stand 100 and/or to pull straps 256 associated with the top end of the ladder stand 100. For example, in some embodiments, the lifting mechanism 254 and/or the pull straps 256 can be attached to hand rails on the ladder stand 100. Additionally or alternatively, in some embodiments, the lifting mechanism 254 and/or the pull straps 256 can be attached to or near the tree blade of the ladder stand 100. In some embodiments, the first end of the lifting mechanism 254 and/or the pull straps 256 can form a V or a Y to create two attaching points at the first end 255 of the lifting mechanism 254.

Figure 6:
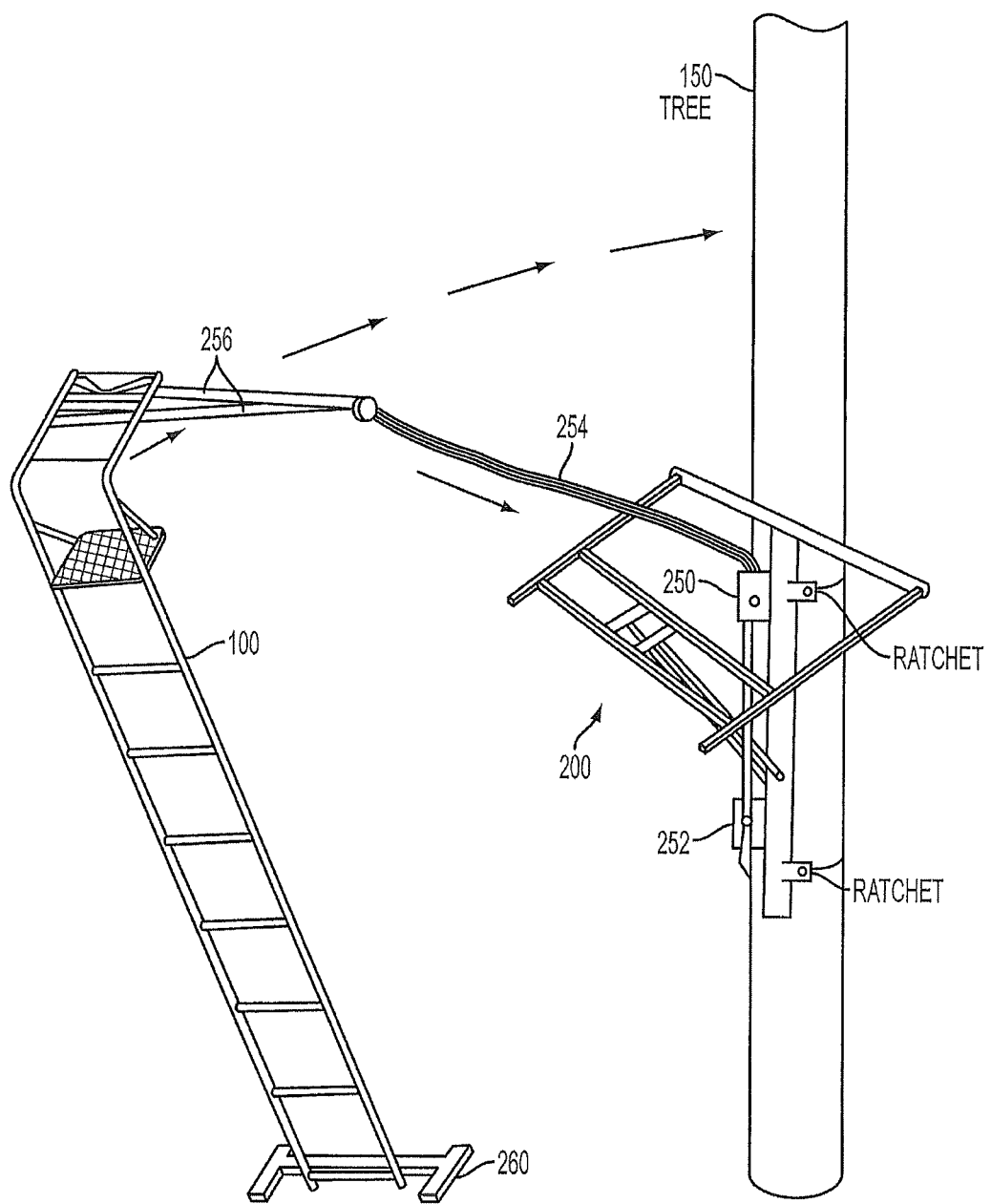
FIG. 6 is a perspective view of a safety rail being used to erect a ladder stand in accordance with disclosed embodiments.

A second end of the lifting mechanism 254 can be inserted into the second guiding mechanism 252. In embodiments in which the second guiding mechanism 252 includes a winch and/or a crank, the winch can be cranked to eliminate slack in the lifting mechanism 254 as it extends from the second guiding mechanism 252, along the length of the elongated vertical member 210, through the first guiding mechanism 250, and to the ladder stand 100. As best seen in FIG. 6, the winch can be continually cranked to lift the ladder stand 100, beginning at the top end thereof, off of the ground until the stand 100 is upright and in the receiving region R defined by the third stabilizing member 224 and distal end portions of the first and second cross-bar members 240, 242. In some embodiments, a user may guide the ladder stand 100 into the region R as the stand 100 approaches the region R.

Once the ladder stand 100 is in the receiving region R, the winch can continue to be cranked until a top end of the stand 100 is adjacent to and resting on the third stabilizing member 224. Then, the winch can continue to be cranked so as to pull the top of the stand 100 with a downward tension and so that the tree blade of the stand 100 abuts the tree trunk 150. At this point, the ladder stand 100 is erect, and a user can safely climb the stand 100 and use a ratchet strap to secure the ladder stand 100 to the at least one of the stabilizing members, for example, the second stabilizing member 222 and/or the third stabilizing member 224. Then, the user can continue climbing the stand 100 to the top thereof and use a ratchet strap to secure to the stand 100 to the tree trunk 150.

After the ladder stand 100 is secured to the tree trunk 150, the safety rail 200 can be removed from the ladder stand 100 and the tree trunk 150. That is, the ladder stand 100 can be fully supported by the tree trunk 150 without the aid of the safety rail 200 once the stand 100 is secured to the tree trunk 150.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. An apparatus comprising:
    an elongated member for directly connecting to a tree trunk, the elongated member having a top end and a bottom end;
    a stabilizer directly connecting to the top end of the elongated member, the stabilizer having a receiving region for receiving and stabilizing an inner section of a ladder stand during erection of the ladder stand and prior to a top section of the ladder stand being secured to the tree trunk; and
    a lifter attached to the elongated member along a length of the elongated member by first and second guides attached to the elongated member, wherein a first end of the lifter is configured to extend above the elongated member during erection of the ladder stand and is configured to attach to the top section of the ladder stand, and wherein a second end of the lifter is configured to attach to the second guide;
    wherein the second guide is configured to lift the ladder stand upright such that the inner section is received by the receiving region.

2. The apparatus as in claim 1 wherein the stabilizer includes first and second stabilizing members extending between first and second cross-bar members, the first stabilizing member directly connecting to the top end of the elongated member, and the second stabilizing member and the cross-bar members defining the receiving region.

3. The apparatus as in claim 2 wherein the elongated member is perpendicular to at least one of the first and second stabilizing members.

4. The apparatus as in claim 1 wherein the elongated member includes at least one mounting bracket for attaching to the tree trunk.

5. The apparatus as in claim 4 wherein the at least one mounting bracket includes at least one connector configured to connect to a ratchet strap for wrapping around the tree trunk.

6. The apparatus as in claim 1 wherein the first guide includes a guide pin attached to an upper portion of the elongated member.

7. The apparatus as in claim 1 wherein the second guide includes a crank for tightening the lifter.

8. An apparatus comprising:
    an elongated member for directly connecting to a tree trunk, the elongated member having a top end and a bottom end;
    a stabilizer directly connecting to the top end of the elongated member, the stabilizer having a receiving region for receiving and stabilizing a ladder stand during erection of the ladder stand and prior to the ladder stand being secured to the tree trunk; and
    a lifter attached to the elongated member along a length of the elongated member by first and second guides attached to the elongated member, a first end of the lifter for attaching to the ladder stand and a second end of the lifter for attaching to the second guide;
    wherein the second guide lifts the ladder stand upright and into the receiving region,
    wherein the stabilizer includes first and second stabilizing members extending between first and second cross-bar members, the first stabilizing member directly connecting to the top end of the elongated member, and the second stabilizing member and the cross-bar members defining the receiving region, and
    wherein the second stabilizing member is indirectly connected to the top end of the elongated member, wherein the first and second cross-bar members are connected by a third stabilizing member, the third stabilizing member set between the first and second stabilizing members.

9. The apparatus as in claim 8 wherein the second stabilizing member and distal end portions of the cross-bar members define the receiving region.

10. The apparatus as in claim 8 wherein the stabilizer includes at least one anchor for supporting the third stabilizing member.

11. The apparatus as in claim 10 wherein a first end of the at least one anchor is connected to the elongated member, wherein a second end of the at least one anchor is connected to the stabilizer, and wherein the at least one anchor extends away at an angle from the elongated member.

12. The apparatus as in claim 8 wherein the stabilizer includes a third cross-bar member, wherein the third cross-bar member connects the second and third stabilizing members, and wherein the third cross-bar member is perpendicular to the second and third stabilizing members.

13. The apparatus as in claim 12 wherein the first cross bar member is connected to the third and second stabilizing members at respective first ends of the third and second stabilizing members, and wherein the second cross bar member is connected to the third and second stabilizing members at respective second ends of the third and second stabilizing members, and wherein the first cross bar member is not directly contacting the second cross bar member.

14. The apparatus as in claim 8 wherein the second stabilizing member extends in a direction lateral to a treeward side of the elongated member,
    wherein the third cross-bar member extends between the second and third stabilizing members, and at least one anchor mechanism extends between the elongated member and the third cross-bar member.

\* \* \* \* \*